United States Patent Office 3,694,150
Patented Sept. 26, 1972

3,694,150
PREPARATION OF MONOAMMONIUM ALUMINUM TETRAFLUORIDE
Gustave E. Kidde, 294 California Terrace,
Pasadena, Calif. 91105
No Drawing. Continuation-in-part of applications Ser. No. 802,274, Feb. 25, 1969, now Patent No. 3,556,717, and Ser. No. 839,096, July 3, 1969, now Patent No. 3,525,584, which is a continuation of applications Ser. No. 328,126, Dec. 4, 1963, Ser. No. 483,241, Aug. 27, 1965, and Ser. No. 575,205, July 18, 1966. This application July 10, 1970, Ser. No. 53,999
The portion of the term of the patent subsequent to Aug. 25, 1987, has been disclaimed
Int. Cl. C01f 7/50, 7/52
U.S. Cl. 423—465                    2 Claims

ABSTRACT OF THE DISCLOSURE

The disclosure relates to a hydrometallurgical process for preparing monoammonium aluminum tetrafluoride by reaction of acid salts of aluminum with ammonium fluoride in aqueous solution. Useful acid salts of aluminum include aluminum sulfate, ammonium alum, aluminum chloride and aluminum nitrate.

CROSS REFERENCE TO RELATED APPLICATIONS

This application is a continuation-in-part of my copending applications, Ser. No. 802,274 filed Feb. 25, 1969 now U.S. Pat. No. 3,556,717; and Ser. No. 839,096 field July 3, 1969 now U.S. Pat. No. 3,525,584 which was a continuation of my following abandoned applications: Ser. No. 575,205 filed July 18, 1966; Ser. No. 328,126 filed Dec. 4, 1963, Ser. No. 483,241 filed Aug. 27, 1965.

BACKGROUND OF THE INVENTION

The field of the invention is hydrometallurgy and more specifically relates to hydrometallurgical processes for the production of monoammonium aluminum tetrafluoride. Monoammonium aluminum tetrafluoride is useful for the production of aluminum fluoride and has been made in the past by the controlled thermal decomposition of triammonium aluminum hexafluoride above 175° C.:

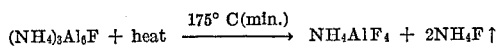

$$(NH_4)_3AlF_6 + heat \xrightarrow{175° C (min.)} NH_4AlF_4 + 2NH_4F \uparrow$$

The ammonium fluoride was evolved as a sublimate and could be recovered outside of the decomposition zone.

The conversion of triammonium aluminum hexafluoride to high purity aluminum fluoride is well known and proceeds through monoammonium aluminum tetrafluoride by the following reaction:

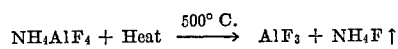

$$NH_4AlF_4 + Heat \xrightarrow{500° C} AlF_3 + NH_4F \uparrow$$

The net reaction is as follows:

$$(NH_4)_3AlF_6 + Heat \longrightarrow AlF_3 + 3NH_4F \uparrow$$

Thus it was necessary to produce three molecules of ammonium fluoride sublimate for each desired molecule of aluminum fluoride.

SUMMARY OF THE INVENTION

It has been discovered that a high yield of monoammonium aluminum tetrafluoride can be obtained by reacting acid salts of aluminum with ammonium fluoride. Aluminum salts useful with this invention include aluminum sulfate, ammonium alum, aluminum chloride and aluminum nitrate. The reaction is carried out in aqueous solution and yields in the range of 70 to 80% monoammonium aluminum tetrafluoride can be obtained with the balance being triammonium aluminum hexafluoride.

It is a primary object of this invention to provide a process for the preparation of monoammonium aluminum tetrafluoride.

It is another important object of the invention to provide a hydrometallurgical process for the production of monoammonium aluminum tetrafluoride.

It is yet another object of the invention to provide a process for the production of monoammonium aluminum tetrafluoride which process provides a high yield of monoammonium aluminum tetrafluoride.

DESCRIPTION OF THE PREFERRED EMBODIMENTS

The reaction may be carried out in conventional equipment; preferably such equipment should be provided with means for agitation and means for separating a solid precipitate from a solution. Heating means may also be useful.

The atomic ratio of fluorine to aluminum (F/Al) should be between 3.4 and 4.5 to 1 in order to obtain this high yield of monoammonium aluminum tetrafluoride. This is equivalent to a weight ratio of between 2.4 and 3.15 to 1.0. Further, the concentration of ammonium fluoride solution should be at least 30% by weight $NH_4F$ when using aluminum sulfate, ammonium alum or aluminum chloride. When aluminum nitrate is used, the ammonium fluoride concentration cannot exceed 21% $NH_4F$ by weight. The reaction temperature is not critical and any temperature above freezing is satisfactory. Reaction time is about 30 minutes at 60 to 70° F.

The invention may be more readily understood by reference to the following examples.

EXAMPLE I

Procedure: 880 grams of ammonium alum were dissolved in 740 grams of $H_2O$. The solution was heated to 167°F. in order to dissolve the ammonium alum. 400 grams of plant produced $NH_4F$ was then added, agitated for 10 minutes, then allowed to stand for 24 hours. It was then filtered, washed, and the cake dried at 250° F.

DATA
Weight of strong filtrate—1484.2 grams
Weight of wash—511.2 grams

|  | Wet | Dry |
|---|---|---|
| Net weight of cake | 365.8 grams | 253.9 grams. |
| pH of final slurry |  | 3.2 |
| pH of strong filtrate |  | 3.0 |
| pH of wash |  | 3.1 |
| Specific gravity of strong filtrate |  | 1.184 |
| Specific gravity of wash |  | 1.1080 |

ANALYSIS

| | |
|---|---|
| Percent F in dry cake (wet analysis) | 61.88 |
| Percent F in dry cake (X-ray) | 62.00 |
| Percent $NH_3$ in dry cake (wet analysis) | 18.80 |
| Percent $NH_3$ in dry cake (X-ray) | 16.50 |
| Percent Al in dry cake (wet analysis) | 19.20 |
| Percent Al in dry cake (X-ray) | 20.60 |
| Percent $NH_3$ in strong filtrate | 7.34 |
| Percent F in strong filtrate | 0.93 |
| Percent $Al_2O_3$ in strong filtrate | 0.31 |
| Percent $NH_3$ in wash | 3.71 |
| Percent F in wash | 0.81 |
| Percent $Al_2O_3$ in wash | 0.24 |
| Percent $NH_4AlF_4$ (X-ray) | 80 |
| Percent $(NH_4)_3AlF_6$ (X-ray) | 20 |

EXAMPLE 2

Example 1 was repeated to determine its consistency and the following data were obtained:

Weight of strong filtrate—1434.8 grams
Weight of wash—524.2 grams

|  | Wet | Dry |
|---|---|---|
| Net weight of cake | 374.2 grams | 252.5 grams |
| pH of final slurry |  | 3.2 |
| pH of strong filtrate |  | 3.0 |
| pH of wash |  | 3.1 |
| Specific gravity of strong filtrate |  | 1.188 |
| Specific gravity of wash |  | 1.090 |

Analysis

| | |
|---|---|
| Percent F in dry cake (wet analysis) | 62.50 |
| Percent F in dry cake (X-ray) | 62.50 |
| Percent $NH_3$ in dry cake (wet analysis) | 17.10 |
| Percent $NH_3$ in dry cake (X-ray) | 15.23 |
| Percent Al in dry cake (wet analysis) | 21.00 |
| Percent Al in dry cake (X-ray) | 21.40 |
| Percent $NH_3$ in strong filtrate | 7.68 |
| Percent F in strong filtrate | 1.70 |
| Percent $Al_2O_3$ in strong filtrate | 0.15 |
| Percent $NH_3$ in wash | 2.55 |
| Percent F in wash | 1.03 |
| Percent $Al_2O_3$ in wash | 0.13 |
| Percent $NH_4AlF_4$ (X-ray) | 85 |
| Percent $(NH_4)_3AlF_6$ (X-ray) | 15 |

EXAMPLE 3

Procedure: 400 grams of plant produced $NH_4F$ salt was dissolved in 740 ml. of ambient temperature water. This $NH_4F$ solution was added to 880 grams of ground commercial alum, with agitation during the addition. The slurry was allowed to stand for two hours then filtered, washed, and the cake dried at 250° F.

Data

| | |
|---|---|
| Time to filter strong filtrate (S & S No. 589) paper) | 2 min., 1 sec. |
| Time to filter wash liquor (S & S No. 589) paper | 1 min., 9 sec. |
| Weight of strong filtrate removed | 1564.0 grams. |
| Weight of wash liquor | 435.5 grams. |
| Weight of wet cake | 355.6 grams. |
| Weight of dry cake | 263.3 grams. |
| pH of $NH_4F$ solution | 6.2 |
| pH of slurry | 2.6. |
| pH of strong filtrate | 2.5. |
| pH of wash liquors | 2.85. |
| Sp. gr. of strong filtrate | 1.098. |
| Sp. gr. of wash | 1.052. |

Analysis

| | |
|---|---|
| Percent F in $NH_4F$ used | 43.51 |
| Percent $NH_3$ in $NH_4$ used | 32.92 |
| Percent $Al_2O_3$ in alum used | 12.81 |
| Percent F in dry cake (wet analysis) | 61.9 |
| Percent F in dry cake (X-ray) | 62.2 |
| Percent $NH_3$ in dry cake (wet analysis) | 19.23 |
| Percent $NH_3$ in dry cake (X-ray) | 15.95 |
| Percent F in strong filtrate | 1.44 |
| Percent $NH_3$ in strong filtrate | 6.80 |
| Percent $NH_3$ in wash liquors | 2.83 |
| Percent F in wash liquors | 0.83 |
| Percent $NH_4AlF_4$ (X-ray) | 85.0 |
| Percent $(NH_4)_3AlF_6$ (X-ray) | 15.0 |

EXAMPLE 4

Procedure: 400 grams of plant manufactured $NH_4F$ were dissolved in 400 ml. of tap water. 800 grams of commercial ammonium alum were dissolved in 533 grams of water, this was heated to 210° F. in order for all of the salt to be in solution. The two solutions were then blended together and mixed for approximately 10 minutes. The slurry was then allowed to stand for 24 hours. After 24 hours the slurry was filtered, washed, and the cake dried at 250° F. Analysis were then obtained on the components.

Data

| | |
|---|---|
| Weight of wet cake | 425.2 grams. |
| Weight of dry cake | 267.9 grams. |
| Weight of strong filtrate recovered | 1414.5 grams. |
| Weight of wash liquors recovered | 455.2 grams. |
| Time to filter strong filtrate (S & S No. 589 paper) | 7 min., 50 sec. |
| Time to filter wash liquors (S & S No. 589 paper) | 4 min., 12 sec. |
| pH of $NH_4F$ solution | 6.7. |
| pH of slurry after 24 hrs. | 3.2. |
| pH of strong filtrate | 3.1. |
| pH of wash | 3.3. |
| Sp. gr. of strong filtrate | 1.180. |
| Sp. gr. of wash liquors | 1.102. |

Analysis

| | |
|---|---|
| Percent F of dry cake (wet analysis) | 62.5 |
| Percent F of dry cake (X-ray) | 62.4 |
| Percent $NH_3$ of dry cake (wet analysis) | 16.6 |
| Percent $NH_3$ of dry cake (X-ray) | 15.2 |
| Percent F in strong filtrate | 2.24 |
| Percent $NH_3$ in strong filtrate | 6.96 |
| Percent F in wash liquors | 1.32 |
| Percent $NH_3$ in wash liquors | 4.59 |
| Percent Al in the cake (wet analysis) | 19.9 |
| Percent Al in the cake (X-ray) | 21.4 |
| Percent $NH_4AlF_4$ (X-ray) | 90.0 |
| Percent $(NH_4)_3AlF_6$ (X-ray) | 10.0 |

EXAMPLE 5

Procedure: A series of samples were prepared as follows: 400 grams of plant produced $NH_4F$ were dissolved in 400 grams of water. Another solution was made consisting of 880 grams of ground commercial ammonium alum dissolved in 533 ml. of water heated to approximately 200° F. in order to dissolve the alum. The two solutions were then poured simultaneously into a common vessel and mixed for 10 minutes. The slurry was allowed to stand for the desired time, as noted, then filtered, washed and the cake dried at 250° F. Analyses were then obtained on the components. Reaction times are 15 min., 1 hr., 4 hrs., and 24 hours. The filtration of the slurry was performed on a FEINC horizontal test unit. Each sample received 400 ml. of hot tap water as wash.

Data

Sample A (15 mins.)

| | |
|---|---|
| Time to remove strong filtrate | 7 min. 3 sec. |
| Time to remove wash | 3 min. 55.8 sec. |
| pH of strong filtrate | 3.1. |
| pH of wash | 3.2. |
| Weight of strong filtrate recovered | 1522.1 grams. |
| Weight of wash liquor recovered | 473.6 grams. |
| Weight of wet cake | 451.3 grams. |
| Weight of dry cake | 245.3 grams. |
| Sp. gr. of strong filtrate | 1.104. |
| Sp. gr. of wash liquor | 1.106. |
| Depth of cake on filter leaf | 1¾ inches. |

Analysis

| | |
|---|---|
| Percent $Al_2O_3$ in alum used | 12.81 |
| Percent F in $NH_4F$ used | 43.51 |
| Percent F in dry cake | 61.5 |
| Percent $NH_3$ in dry cake | 16.06 |
| Percent F in strong filtrate | 2.09 |
| Percent $NH_3$ in strong filtrate | 6.21 |
| Percent F in wash liquor | 1.10 |
| Percent $NH_3$ in wash liquor | 3.92 |
| Percent $NH_4AlF_4$ (X-ray) | 80.0 |
| Percent $(NH_4)_3AlF_6$ (X-ray) | 20.0 |

Sample B (1 hr.)

| | |
|---|---|
| Time to remove strong filtrate | 4 min., 51 sec. |
| Time to remove wash | 2 min., 39.1 sec. |
| pH of slurry | 3.4. |
| pH of strong filtrate | 3.4. |
| pH of wash | 3.4. |
| Sp. gr. of strong filtrate | 1.108. |
| Sp. gr. of wash | 1.090. |
| Weight of strong filtrate recovered | 1513.9 grams. |
| Weight of wash liquor recovered | 484.5 grams. |
| Weight of wet cake | 464.8 grams. |
| Weight of dry cake | 241.2 grams. |
| Depth of cake on filter leaf | 2.0 inches. |

Analysis

| | |
|---|---|
| Percent F in dry cake | 61.4 |
| Percent $NH_3$ in dry cake | 15.0 |
| Percent F in strong filtrate | 2.06 |
| Percent $NH_3$ in strong filtrate | 6.30 |
| Percent F in wash | 1.04 |
| Percent $NH_3$ in wash | 3.86 |
| Percent $NH_4AlF_4$ (X-ray) | 95.0 |
| Percent $(NH_4)_3AlF_6$ (X-ray) | 5.0 |

Sample C (4 hrs.)

| | |
|---|---|
| Time to remove strong filtrate | 6 min., 17.8 sec. |
| Time to remove wash liquor | 3 min., 13.3 sec. |
| pH of slurry | 3.2. |
| pH of strong filtrate | 3.2. |
| pH of wash | 3.4. |
| Weight of strong filtrate | 1520.1 grams. |
| Weight of wash | 499.0 grams. |
| Weight of wet cake | 343.8 grams. |
| Weight of dry cake | 217.3 grams. |
| Percent VM of wet cake | 37.0. |
| Depth of cake on filter leaf | 1⅞ inches. |

Analysis

| | |
|---|---|
| Percent F in dry cake | 61.4 |
| Percent $NH_3$ in dry cake | 16.3 |
| Percent F in strong filtrate | 2.10 |
| Percent $NH_3$ in strong filtrate | 6.39 |
| Percent F in wash liquors | 0.98 |
| Percent $NH_3$ in wash liquors | 3.61 |
| Sp. gr. of strong filtrate | 1.107 |
| Sp. gr. of wash liquors | 1.067 |
| Percent $NH_4AlF_4$ (X-ray) | 75.0 |
| Percent $(NH_4)_3AlF_6$ (X-ray) | 25.0 |

Sample D (24 hrs.)

| | |
|---|---|
| Time to remove strong filtrate | 9 min., 10 sec. |
| Time to filter wash liquor | 4 min., 25 sec. |
| pH of slurry | 3.2. |
| pH of strong filtrate | 3.2. |
| pH of wash | 3.3. |
| Weight of strong filtrate recovered | 1547.9 grams. |
| Weight of wash liquor recovered | 488.8 grams. |
| Weight of wet cake | 469.0. |
| Weight of dry cake | 232.1. |
| Depth of cake on filter leaf | 2⅛ inches. |
| Sp. gr. of strong filtrate | 1.107. |
| Sp. gr. of wash liquors | 1.1070. |

Analysis

| | |
|---|---|
| Percent F in dry cake | 61.8 |
| Percent $NH_3$ in dry cake | 16.4 |
| Percent in the strong filtrate | 2.20 |
| Percent $NH_3$ in the strong filtrate | 6.25 |
| Percent F in the wash liquor | 0.70 |
| Percent $NH_3$ in wash liquor | 3.02 |
| Percent $NH_4AlF_4$ in the dry cake (X-ray) | 80.0 |
| Percent $(NH_4)_3AlF_6$ in the dry cake (X-ray) | 20.0 |
| Percent F in $NH_4F$ used in all samples | 48.6 |
| Percent $NH_3$ in $NH_4F$ used in all samples | 31.6 |

EXAMPLE 6

Procedure: Aluminum nitrate $(Al(NO_3)_3 \cdot 9H_2O)$ was used in conjunction with ammonium fluoride. Several concentrations of ammonium fluoride were used. The data are as follows:

| | | | | |
|---|---|---|---|---|
| Percent $NH_4F$ | 20 | 25 | 34 | 50 |
| Grams $NH_4F$ (48.5 percent F) | 14.8 | 14.8 | 14.8 | 14.8 |
| Grams water | 59.2 | 44.4 | 29.2 | 14.8 |
| Grams $Al(NO_3)_3 \cdot 9H_2O$ (7.3 percent Al) | 37.5 | 37.5 | 37.5 | 37.5 |
| Wet cake—grams | 17.9 | None | None | None |
| Dry cake—grams | 12.0 | None | None | None |
| Percent F in dry cake | 62.7 | | | |
| Percent $NH_3$ in dry cake | 12.8 | | | |
| Percent $NH_4AlF_4$ (X-ray) | 100 | | | |
| Strong filtrate—grams | 90.9 | | | |
| Percent F in strong filtrate | Nil | | | |
| Percent $NH_3$ in strong filtrate | 4.95 | | | |
| Wash liquor—grams | 52.1 | | | |
| Percent F in wash | Nil | | | |
| Percent $NH_3$ in wash | 1.29 | | | |

A material balanced on the 20% solution showed:
Percent F accounted for—99.2%
Percent Al accounted for—99.3%
Percent $NH_3$ accounted for—100.9%

EXAMPLE 7

Procedure: Aluminum chloride $(AlCl_3 \cdot 6H_2O)$ was used in conjunction with ammonium fluoride solution (46.25% $NH_4F$).

Data

| | |
|---|---|
| Grams ammonium fluoride (48.8% F) | 148.0 |
| Grams water | 172.0 |
| Grams $AlCl_3 \cdot 6H_2O$ (11.7% Al) | 242.0 |
| pH of $NH_4F$ solution | 7.5 |
| ph of slurry | 2.8 |

The aluminum chloride was added at ambient temperature and the precipitate was filtered, washed and dried at 250° F.

| | |
|---|---|
| Grams of wet fluoroaluminate | 221.6 |
| Grams of dry fluoroaluminate | 115.3 |
| Percent F in dry cake | 62.7 |
| Percent $NH_3$ in dry cake | 13.7 |
| Percent F in filtrates | Nil |
| Percent monoammonium aluminum tetrafluoride (X-ray) | 100.0 |

A 5.0 gram sample was heated to 900° F and yielded a product containing 67% fluorine and weighing 3.42 grams. A material balance shows:

| | |
|---|---|
| Percent F accounted for | 99.7 |
| Percent Al accounted for | 97.4 |
| $AlF_3$ produced, grams | 78.9 |
| Percent $AlF_3$ in end product | 98.73 |

Examples 1 and 2 indicate excellent reproducibility and a yield of 80 to 85% monoammonium aluminum tetrafluoride with the remaining compound produced being triammonium aluminum hexafluoride. Example 3 shows a similar yield using ground commercial alum in place of aluminum alum. A yield of 90% was obtained using commercial ammonium alum as shown in Example 4.

The effect of reaction time was studied using ammonium alum as shown in Example 5. It can be seen that reaction time beyond 15 minutes had no noticeable effect upon the yield of the end products.

A 100% yield of monoammonium aluminum tetrafluoride was obtained using aluminum nitrate as the reaction when the ammonium fluoride concentration was 20%. However, when the ammonium fluoride concentration was 25% or higher, no monoammonium aluminum tetrafluoride resulted. Concentrations of less than 21% have been found useful.

Example 7 indicates that it is possible to produce 100% monoammonium aluminum tetrafluoride using aluminum chloride and an ammonium fluoride concentration as high as 46%.

It is apparent that this process can be carried out to give consistently high yields of monoammonium aluminum tetraflouride. Where the prior art process required a thermal decomposition of triammonium aluminum hexafluoride at a temperature of above 175° C., the process of this invention may be carried out at ambient temperatures. Where the prior art process produced two molecules of ammonium fluoride by-product for each molecule of monoammonium aluminum tetrafluoride, the process of this invention results in direct yields between 70 and 100%.

The process may be carried out utilizing commercial grades of reactants. Reaction temperature may be varied over a wide range above the freezing point. The scope of this invention is thus limited only by the claims which follow.

I claim:

1. A process for the preparation of a major proportion of monoammonium aluminum tetrafluoride and a minor proportion of triammonium aluminum hexafluoride comprising: reacting ammonium fluoride in an aqueous solution of at least 30% concentration by weight with ammonium alum in an amount sufficient to cause the atomic ratio of fluorine to aluminum to be between 3.4 and 4.5 to 1, said reaction being agitated during at least the early stages thereof, and permitted to stand for a time sufficient for said reaction to proceed to about completion, whereupon the resulting monoammonium aluminum tetrafluoride and triammonium aluminum hexafluoride are separated from the liquid and dried at about 250° F.

2. The process of claim 1, wherein the reaction is carried out at ambient temperature.

References Cited
UNITED STATES PATENTS

| | | | |
|---|---|---|---|
| 3,525,584 | 8/1970 | Kidde | 23—88 |
| 3,501,268 | 3/1970 | Laran et al. | 23—88 X |

EDWARD STERN, Primary Examiner